April 17, 1934.  E. M. MORLEY  1,955,595
AIR SERVICE DISPENSING DEVICE
Filed April 28, 1930
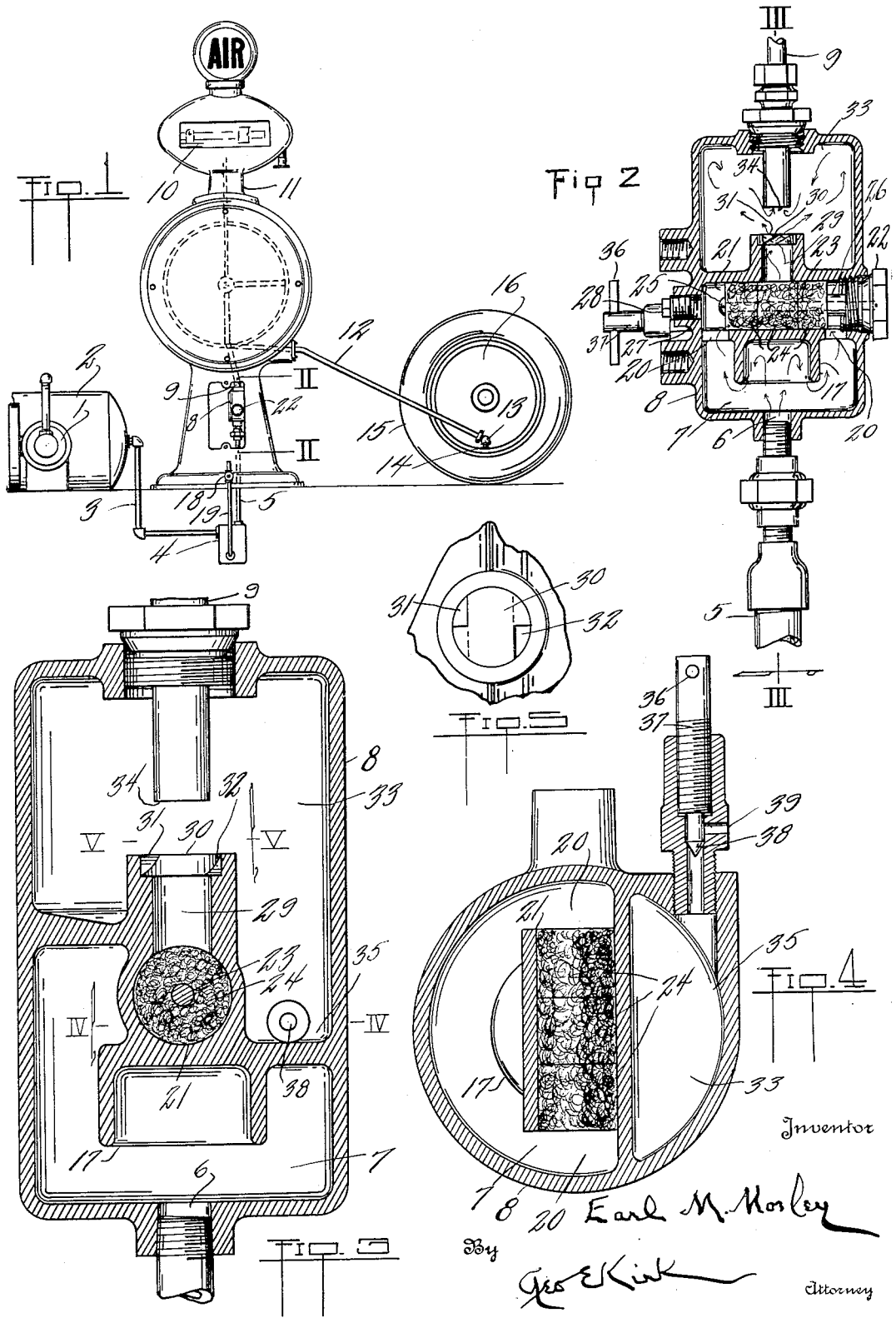

Patented Apr. 17, 1934

1,955,595

UNITED STATES PATENT OFFICE 1,955,595

AIR SERVICE DISPENSING DEVICE

Earl M. Morley, Delta, Ohio, assignor, by mesne assignments, to Harry Haudenschild, Toledo, Ohio Application April 28, 1930, Serial No. 447,957

3 Claims. (Cl. 183—48)

This invention relates to air dispensing equipment.

This invention has utility when incorporated in pressure air apparatus for the charging of tires of motor vehicles, more especially for automatic pulsating delivery to a predetermined pressure.

Referring to the drawing:

Fig. 1 is a side elevation with parts broken away of an embodiment of the invention in an air service installation for motor vehicles;

Fig. 2 is a detail view, in vertical section, on an enlarged scale, on the line II—II, Fig. 1;

Fig. 3 is a section on the line III—III, Fig. 2;

Fig. 4 is a section on the line IV—IV, Fig. 3; and

Fig. 5 is a view on the line V—V, Fig. 3, looking in the direction of the arrow.

Compressor 1 is shown at charging tank 2 a reservoir from which extends line 3 to water trap 4 from which riser pipe 5 enters by way of port 6 to chamber 7 of housing 8. From this housing 8 leads an upper discharge duct 9 to automatic pulsating regulator valve 10 (U. S. Patent 1,736,274, Morley, Nov. 19, 1929) from which air may pass in standard 11 to hose 12 having terminal check valve or tire chuck 13 for application to valve stem 14 of tire 15 of a motor vehicle on wheel 16.

The eddy chamber 7 is shown as having depending flange 17 providing a cup opposite the intake port 6. There is thus formed a baffle directing particles as entrained in the air to be local to the region of the port 6, and at the pulsation or intermission of flow to drop back through the port 6 and line 5 into the blow off chamber 4 there to be condensed, if oil or water or other liquid material, while if solid, to be entrained therein so that with the pressure on the system valve 18 may be opened and thus allow flow by line 19 as a blow off or cleaning means for the trap 4.

This air, as eddy cleaned in the chamber 7, may flow by ports 20 into way 21 having valve packing terminal plug 22 carrying stem 23 about which are wrappings or fibrous rings 24 held by head 25 toward loose sleeve 26. This plug entraining means or filter in the way 21 may be readily removed for cleaning or replacing of the fibrous matter by removing the plug 22. In the event that there may be difficulties in removing this unit, oppositely from the plug 22 the way 21 is provided with port 27 closed by plug 28. This plug 28 may be removed and a bar or rod shoved therethrough for forcing the stem 23 out through the opening from which the plug 22 has been removed.

The eddy air passing by the ports 20 into central meeting position in the way 21 through the baffle 24 may pass upward therefrom by port 29 to the underside of disk 30 herein shown as having oppositely inclined ways 31, 32, upwardly directed from the way 21 for developing in this inlet to chamber 33 of the housing 7 a swirl away from outlet port 34 of the pipe or line 9. This outlet port 34 is on a depending stem from the line 9 into the chamber 33 and opposite the disk 30. This swirl is accordingly effective for throwing out from the pulsating flow of air any additional foreign matter which may have passed the trap 4 and not have been rejected from the eddy chamber 7 or may not be impounded with the wrappings or fiber in the way 21. Such additional entrained matter in the chamber 33 is centrifugally thrown to accumulate in low portion 35 as an additional trap in this installation.

Handle 36 may be operated to rotate threaded stem 37 and thereby back off taper valve member 38 in opening from low portion 35 blow off port 39 so that this housing 8 may have a blow off for any accumulation of foreign matter as removed from the air. In some instances this is oil condensation.

The disclosure herein is accordingly of a foreign matter removing installation so that oil from the compressor, condensation from the air, or other foreign matter may not work through to the injury of the automatic pulsating regulator valve 10 or for interference with the valve 13 and at the tire stem 14 or for injury to the rubber of the tire.

What is claimed and it is desired to secure by Letters Patent is:

1. Foreign particle entraining means including a housing providing in series an eddy chamber, a fiber choked way having a stem, fibrous wrapping about the stem, and a rotary externally threaded plug providing a mounting for the stem removable with the wrapping as a unit for wrapping substitution or cleaning.

2. Foreign particle entraining means including a housing providing in series an eddy chamber, a porous way, and a swirl chamber having a depending upwardly projecting outlet port and an inlet disk opposing said port having oppositely upwardly inclined swirl promoting ways.

3. A foreign particle entraining means including a trap, a riser from the trap, a housing providing in series an eddy chamber, a porous way, and a swirl chamber having a depending upwardly projecting outlet port and an inlet disk opposing said port having oppositely upwardly inclined swirl promoting ways.

EARL M. MORLEY.